(12) United States Patent
Kim et al.

(10) Patent No.: US 7,725,988 B2
(45) Date of Patent: Jun. 1, 2010

(54) HINGE ASSEMBLY AND MOBILE DEVICE HAVING THE SAME

(75) Inventors: Yun Tae Kim, Suwon (KR); Kwang Soo Kim, Suwon (KR); Seung Don Lee, Seoul (KR); Hyun Suk Yang, Suwon (KR); Ji Yeon Lee, Seongnam (KR); Jeong Rok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 11/705,780

(22) Filed: Feb. 14, 2007

(65) Prior Publication Data

US 2007/0186380 A1 Aug. 16, 2007

(30) Foreign Application Priority Data

Feb. 15, 2006 (KR) .................. 10-2006-0014780
Sep. 11, 2006 (KR) .................. 10-2006-0087612

(51) Int. Cl.
*E05D 15/06* (2006.01)
(52) U.S. Cl. ..................... 16/361; 16/362; 16/364; 16/357; 16/358; 16/359
(58) Field of Classification Search ............ 16/239, 16/357–359, 362, 364, 379; 361/679.01–679.02, 361/679.09, 679.21, 679.26–679.28, 679.55; 455/550.1, 575.3–575.4; 379/433.01, 433.1, 379/433.11–433.13

See application file for complete search history.

(56) References Cited

U.S. PATENT DOCUMENTS

| | | | | | |
|---|---|---|---|---|---|
| 1,302,178 | A | * | 4/1919 | Korb ........................... | 16/360 |
| 1,864,164 | A | * | 6/1932 | Aldeen ........................ | 16/360 |
| 1,920,452 | A | * | 8/1933 | Wagner ....................... | 108/32 |
| 4,411,046 | A | * | 10/1983 | Nawrath ...................... | 16/354 |
| 4,830,328 | A | * | 5/1989 | Takach et al. ............. | 361/679.02 |
| 4,960,256 | A | * | 10/1990 | Chihara et al. ............ | 248/286.1 |
| 5,103,376 | A | * | 4/1992 | Blonder ...................... | 361/681 |
| 5,168,426 | A | * | 12/1992 | Hoving et al. .............. | 361/681 |
| 5,257,767 | A | * | 11/1993 | McConnell ................ | 248/284.1 |
| 5,355,357 | A | * | 10/1994 | Yamamori et al. .......... | 720/646 |
| 5,494,447 | A | * | 2/1996 | Zaidan ........................ | 439/31 |

(Continued)

*Primary Examiner*—Victor Batson
*Assistant Examiner*—Roberta Delisle
(74) *Attorney, Agent, or Firm*—Birch, Stewart, Kolasch & Birch, LLP

(57) ABSTRACT

Disclosed are a hinge assembly and a mobile device having the hinge assembly. In the mobile device, a rotation portion 14 slides and rotates on a base portion 10, so as to be inclined to the base portion 10. For this reason, the rotation portion 14 is connected to the base portion by means of the hinge assembly 20 so as to slide and rotate on the base portion 10. The rotation portion 14 slides on the base portion by a predetermined distance, and then rotates to be inclined at a desired angle with respect to the base portion 10. The rotation portion 14 easily rotates with respect to the base portion of the mobile device, so that the status of the mobile device can be easily converted. Further, when the status of the mobile device is converted, the front, rear, left and right of a display screen is not changed. As a result, the mobile device should not have a structure of changing a display direction of the display screen. Further, there is an advantage in that an electric connection between the base portion and the rotation portion by means of a connection link mechanism can be stably achieved.

17 Claims, 18 Drawing Sheets

U.S. PATENT DOCUMENTS

| | | | |
|---|---|---|---|
| 5,566,048 A * | 10/1996 | Esterberg et al. | 361/681 |
| 5,742,475 A * | 4/1998 | Riddiford | 361/679.09 |
| 5,890,602 A * | 4/1999 | Schmitt | 211/13.1 |
| 5,900,848 A * | 5/1999 | Haneda et al. | 345/1.1 |
| 6,008,983 A * | 12/1999 | Yen | 361/679.11 |
| 6,027,090 A * | 2/2000 | Liu | 248/281.11 |
| 6,322,031 B1 * | 11/2001 | LeClair et al. | 248/286.1 |
| 6,392,149 B1 * | 5/2002 | Kim et al. | 174/72 A |
| 6,442,030 B1 * | 8/2002 | Mammoser et al. | 361/727 |
| 6,484,016 B1 * | 11/2002 | Cheon | 455/90.1 |
| 6,504,707 B2 * | 1/2003 | Agata et al. | 361/679.05 |
| 6,714,403 B2 * | 3/2004 | Furuki et al. | 361/679.09 |
| 6,726,164 B1 * | 4/2004 | Baiza et al. | 248/222.12 |
| 6,827,409 B2 * | 12/2004 | Michael | 312/223.3 |
| 6,836,404 B2 * | 12/2004 | Duarte | 361/679.09 |
| 6,842,627 B2 * | 1/2005 | Harsu et al. | 455/550.1 |
| 6,856,505 B1 * | 2/2005 | Venegas et al. | 361/683 |
| 7,009,112 B1 * | 3/2006 | Mead et al. | 174/69 |
| 2001/0019907 A1 * | 9/2001 | Glad et al. | 439/131 |
| 2003/0103324 A1 * | 6/2003 | Gallivan | 361/681 |
| 2003/0109230 A1 * | 6/2003 | Duarte et al. | 455/90 |
| 2003/0213100 A1 * | 11/2003 | Brain et al. | 16/361 |
| 2008/0081505 A1 * | 4/2008 | Ou et al. | 439/374 |

* cited by examiner

HINGE ASSEMBLY AND MOBILE DEVICE HAVING THE SAME

BACKGROUND OF THE INVENTION

1. Field of the Invention

The present invention relates to a mobile device, and more particularly to a hinge assembly which allows a display unit to slide and swing on a body and a mobile device having the same.

2. Description of the Prior Art

In the present specification, a tablet computer will be described as an example of a mobile device. However, the present invention is not limited to the tablet computer, but can be applied to all kinds of mobile devices. For example, the present invention may be applied to a laptop computer, a portable communication terminal, PDA, etc.

Generally, a tablet computer includes a body having a keyboard on the upper surface thereof and a display unit connected to the body by means of hinge assemblies. The display unit has a liquid crystal display panel to display images. The display unit may be used while being folded on the upper surface of the body or being inclined at a desired angle against the body. Swivel hinge assemblies are used in order to operate the display unit with respect to the body.

However, the tablet computer according to the conventional art as described above has following problems.

The tablet computer is used in the state where a display unit is folded down or inclined at a desired angle against the body. The tablet computer has a relative difficulty in that the display unit rotates with respect to the body in the above-mentioned state. Specifically, it is inconvenient to rotate the display unit to an angle of 180 degrees with respect to the body and to fold the display unit so that the back surface of the display unit makes close contact with the upper surface of the body.

Furthermore, in a case where conventional swivel hinge assemblies are used, the front, the back, the left and the right positions of the display unit change between when the display unit is inclined and when the display unit is folded on the body portion. Specifically, according to the conventional art, when the mode of the display unit is converted, the front, the back, the left and the right positions of the display unit are reversed with respect to the body. Accordingly, when a user views the contents of information displayed on the display unit, the contents can be reversed in the front, the back, the left and the right of the display unit. Of course, the direction of images displayed on the display unit may be changed according to the mode of the display unit. Otherwise, there is inconvenience that the displaying direction of the display unit is changed using a separate sensor and software.

SUMMARY OF THE INVENTION

Accordingly, the present invention has been made to solve the above-mentioned problems occurring in the prior art, and it is an object of the present invention to allow a rotation portion to easily rotate with respect to a base portion in a mobile device.

It is another object of the present invention to prevent the inversion of the front, the back, the left and the right positions of a displayed image when the mode of the mobile device is converted.

It is still another object of the present invention to provide a connection link mechanism which can perform electrical connection between a base portion and a rotation portion which relatively moves with respect to the base portion.

In order to achieve the above objects of the present invention, there is provided a hinge assembly for connecting a base portion and a rotation portion which relatively move, the hinge assembly comprises a stationary frame mounted on the base portion; a rotation frame mounted on the rotation portion and relatively rotating around a hinge shaft with respect to the stationary frame; and a slide plate integrated with the rotation frame for guiding the sliding movement of the rotation portion on the base portion.

A guide skirt is provided along one end of the sliding slide plate.

The slide plates are connected to the hinge assemblies if a plurality of hinge assemblies is used.

The stationary frames and the rotation frame are alternatively arranged and connected to one another by means of the hinge shaft extending through the stationary frames and the rotation frame.

In order to achieve the above objects of the present invention, there is provided a mobile device comprises a base portion including a keyboard at least; a movable rotation portion mounted on the base portion and provided with a display screen at least; and a hinge assembly for connecting the rotation portion to the base portion, which includes a stationary frame fixed to the base portion, a rotation frame mounted on the rotation portion to relatively rotate around a hinge shaft with respect to the stationary frame, and a slide plate integrated with the rotation frame to slide on the base portion.

The stationary frame and the rotation frame constituting the hinge assembly, through which the hinge shaft extends, protrude on the upper surface of the base portion, and slide channels are formed on the rear surface of the rotation portion in order to prevent the interference of the rotation portion with the protruding portions.

A portion of the hinge assembly protruding on the upper surface of the base portion is covered with a hinge cover.

The slide plate is connected to the hinge assemblies if a plurality of hinge assemblies is used.

The rotation portion further comprises guide rails for guiding the relative movement of the slide plate of the hinge assembly, wherein a guide skirt is provided on one end of the slide plate sliding and guided by the guide rails.

A groove is formed in the base portion so that the hinge assembly extends to each end of the portions protruding on the upper surface of the base, so as to prevent the interference when the rotation portion rotates.

Portions of the stationary frame and the rotation frame, through which the hinge shaft extends, are alternately arranged.

In order to achieve the above objects of the present invention, there is provided a hinge assembly for connecting a rotation portion to a base portion which relatively moves, the hinge assembly comprises a stationary frame mounted on the base portion; a rotation frame mounted on the rotation portion and relatively rotating around a hinge shaft; and a slide plate integrated with the rotation frame and provided with rail guide portions moving along rail guides mounted on the rotation portion for guiding the sliding movement of the rotation portion on the base portion.

Step portions respectively are provided on both ends of the rail guide portions of the slide plate and guided by means of the guide rails mounted on the rotation portion.

The slide plate is connected to hinge assemblies if a plurality of hinge assemblies is used.

Present invention further comprises a connection link mechanism for guiding a wire electrically connecting the base portion to the rotation portion which includes a hinge connection link rotatively connected to the slide plate at one end of the hinge connection link, and a rotation portion connection link rotatively connected to the hinge connection link and the rotation portion.

Wire channels are formed in the hinge connection link and a rotation portion connection link so as to receive wires.

In order to achieve the above objects of the present invention, there is provided a mobile device comprises a base portion provided with a keyboard at least; a rotation portion movably mounted on the base portion and provided with at least a display screen; a hinge assembly for connecting the rotation portion to the base portion, which includes a stationary frame fixed to the base portion, a rotation frame relatively rotating around a hinge shaft with respect to the stationary frame, and a slide plate integrated with the rotation frame and having rail guides for allowing the rotation portion to slide on the base portion; a connection link mechanism including a rotation portion connection link rotatively connected to the rotation portion and a hinge connection link rotatively connected to the rotation portion connection link and the hinge assembly which guides wires electrically connecting the rotation portion to the base portion.

Wire channels are formed in the rotation portion connection link and the hinge connection link which constitute the connection link mechanism, so as to receive wires.

The rotation portion connection link is rotatively connected to the rotation portion at a location adjacent to an intermediate portion of one of the guide rails, and is relatively shorter than the hinge connection link.

The rotation portion is provided with the guide rails for guiding the relative movement of the slide plate of the hinge assembly, and the rail guide portions of the slide plate are provided at both sides thereof with step portions, respectively, and guided by means of the guide rails.

A portion of the rotation frame of the hinge assembly is rotatively connected to the stationary frame on the base portion, and a vertical connector of the rotation frame, which is connected to the slide plate perpendicularly, is located on the rotation portion.

The base portion has a seating slit formed at a side on the upper surface of the base portion, in which the vertical connector is received.

BRIEF DESCRIPTION OF THE DRAWINGS

The above objects and other features and advantages of the present invention will become more apparent after a reading of the following detailed description when taken in conjunction with the drawings, in which.

DETAILED DESCRIPTION OF THE PREFERRED EMBODIMENTS

Figure 1:
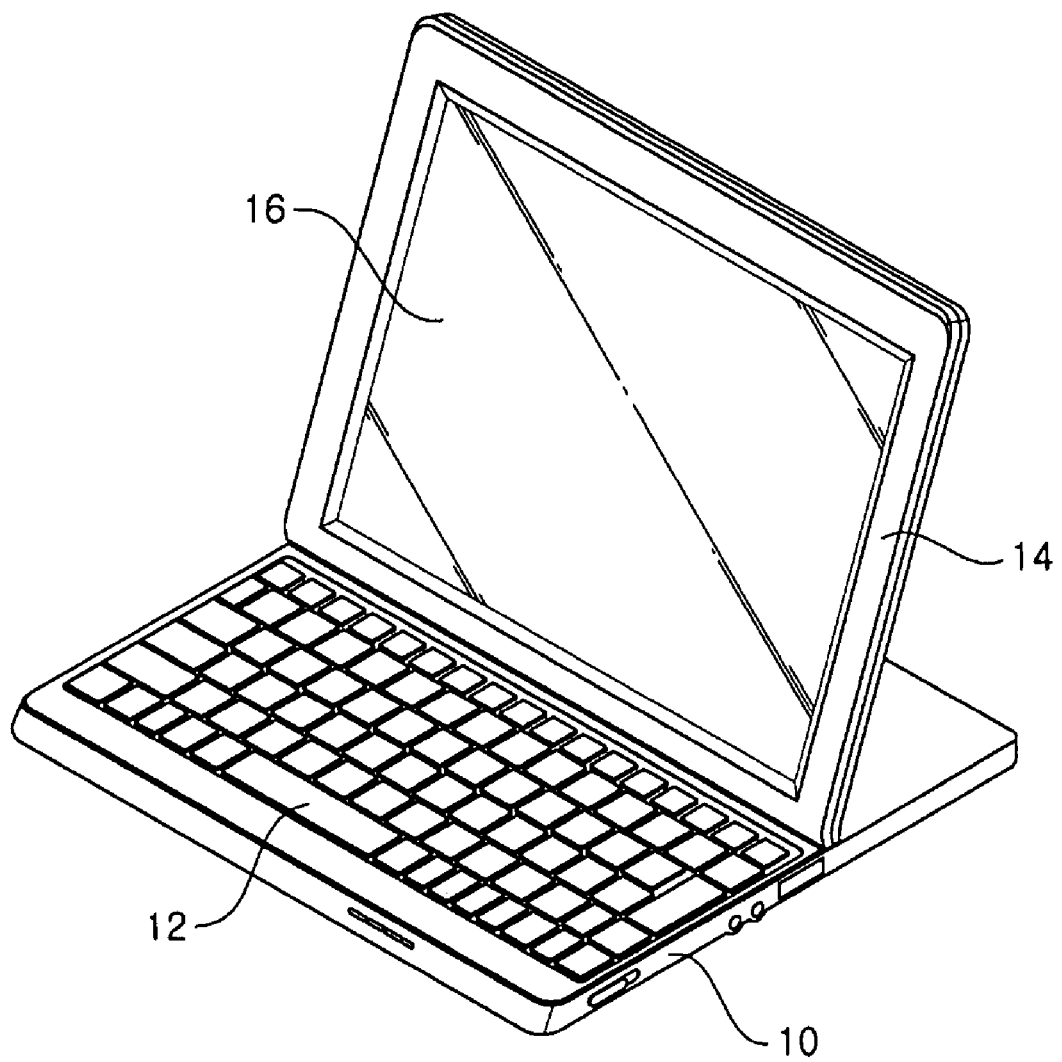
FIG. 1 is a perspective view showing the configuration of a mobile device employing a hinge assembly according to an embodiment of the present invention.

Hereinafter, the preferred embodiments of the hinge assemblies and the mobile devices according to the present invention will be described with reference to the accompanying drawings.

As shown in FIGS. 1 to 3B, a base portion 10 has a flat hexahedral shape. A keyboard 12 is disposed on the upper surface of the base portion 10. The keyboard 12 has a plurality of keys arranged thereon. A user can input information by pressing the keys with his/her fingers. Various parts constituting the mobile device are arranged in the base portion 10. For example, in the case of a tablet computer, a main board, a hard-disk drive, etc. are installed in the base portion.

The rotation portion 14 is connected to the base portion 10 by means of the hinge assembly 20 to be described below. The rotation portion 14 rotates and slides by means of the hinge assembly 20 in view from a leading end of the base portion 10. A display screen 16 is arranged on a surface of the rotation portion 14. A liquid crystal display may be used as the display screen 16. The display screen 16 plays the role of displaying lots of information. Of course, in the case of the tablet computer, information can be input by touching the display screen 16 with a stylus pen. In order to input information through the display screen 16, the liquid crystal display unit having a touch screen function is preferably used as the display screen 16.

For reference, the configuration of the base portion 10 and the rotation portion 14 will be described. The base portion 10 is provided with at least a keyboard (in the case of mobile phone, for example, a keypad), and the rotation portion 14 is provided with at least a display screen 16. For example, the main board, the hard-disk drive, etc. may be mounted in suite on either the base portion 10 or the rotation portion 14.

Meanwhile, the configuration of the hinge assembly 20 will be described with reference to FIGS. 4A and 4B. In the present embodiment, two hinge assemblies 20 are mounted on both sides of the rear end of the keyboard 12 of the base portion 10, respectively. However, if the base portion 10 and the rotation portion 14 have different sizes, only one hinge assembly may be mounted on the rear end of the base portion 10.

A stationary frame 22 is fixed inside of the base 10, a part of which is exposed out of the upper surface of the base portion 10. The stationary frame 22 may have a shape and size design depending on the size or weight of the rotation portion 14 which relatively rotates with respect to the base portion 10.

The rotation frame 26 is provided on the stationary frame 22 so as to rotate around a hinge shaft 24. Of course, the rotation frame 26 is partially exposed out of the rotation portion 14 and connected to the stationary frame 22 by means of the hinge shaft 24, so as to relatively rotate with respect to the stationary frame 22. Specifically, the stationary frame 22 and the rotation frame 26 are designed so that portions through which the hinge shaft 24 extends are located in series. The rotation frame 26 is a substantial plate, excepting a portion through which the hinge shaft 24 extends.

In this embodiment, when the stationary frame 22 and the rotation frame 26 are connected to each other by means of the hinge shaft 24, one end of the hinge shaft 24 extends through the stationary frame 22 and the other end of the hinge shaft 24 extends through the rotation frame 26. However, both ends of the hinge shaft 24 should not extend through the stationary and rotation frames. Specifically, portions of the stationary frame 22 and the rotation frame 26 through which the hinge shaft 24 extends are alternately arranged. For example, both ends of the hinge shaft 24 may be inserted into the portions of the rotation frames 26, and the intermediate portion of the hinge shaft 24 may extend through the portion of the stationary frame 22. Otherwise, both ends of the hinge shaft 24 may be inserted into the portions of the stationary frame 22, and the intermediate portion of the hinge shaft 24 may extend through the rotation frame 26. The portions of the stationary frame 22 and the rotation frame 26 through which the hinge shaft 24 extends are exposed out of the upper surface of the base portion 10.

The rotation frame 26 is provided with a slide plate 28. The slide plate 28 has a desired area, which is integrated with the rotation frame 26. Therefore, when the rotation portion 14 slides on the base portion 10, the rotation portion 14 relatively moves with respect to the rotation frame 26 and the slide plate 28.

The slide plate 28 is provided with a guide skirt 29 at one end thereof in a sliding direction. The guide skirt 29 extends perpendicularly to the slide plate 28 so as to slide on a surface of a guide rail 30 described below. Such a guide skirt 29 guides the relative movement of the slide plate 28 and the rotation portion 14.

The guide rail 30 is mounted in the rotation portion 14 in order to guide the relative movement of the slide plate 28 in the rotation portion 14. The guide rail 30 guides the sliding movement of the slide plate 28. The guide rail 30 is made of a different material from that forming a skeleton of the rotation portion, or is formed with a part of the rotation portion 14.

Further, the rotation portion 14 is supported by means of the rotation frame 26 and the slide plate 28 to the base portion 10. Of course, the rotation portion 26 and the slide plate 28 can relatively move with the rotation portion 14 in the rotation portion 14. Therefore, either the rotation frame 26 or the slide plate 28 is preferably designed so as to relatively move with respect to the rotation portion 14 in the rotation portion 14 when the rotation frame 26 or the slide plate 28 is subjected to force greater than the predetermined level.

Next, a hinge cover 32 is used for covering the stationary frame 22 protruding on the upper surface of the base portion 10 and a portion of the rotation frame 26 connected to the stationary frame 22 by means of the hinge shaft 24. The hinge cover 32 is mounted on the upper surface of the base portion 10 to protrude. The hinge cover 32 is formed by cutting a cylindrical pipe lengthwise in half.

A sliding channel 34 is formed on the rear surface of the rotation portion 14 in order to avoid the interference of a part of the hinge assembly 20, for example, the stationary frame 22, the rotation frame 26, and the hinge cover 32, which protrudes from the upper surface of the base portion.

Figure 4A:
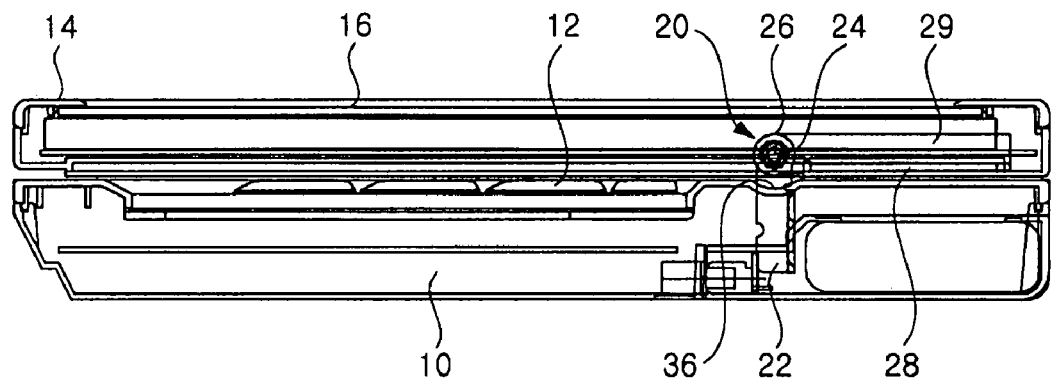
FIGS. 4A and 4B are views showing the operation of the mobile device according to the embodiment of the present invention, in which the rotation portion is folded on the base portion.

As shown in FIG. 4A, a groove 36 is formed on the upper surface of the base portion 10 to lengthen transversely. The groove 36 lengthens along an extending line of connecting the hinge covers 32 to each other. The grooves 36 are formed between the hinge covers 32 on the upper surface of the base portion 10, and extend from each hinge cover 32 to both ends of the base portion 10. The grooves 36 prevent the interference between the rotation portion 14 and the base portion 10 when the rotation portion 14 rotates with respect to the base portion 10. Accordingly, a leading end of the rotation portion 14 may be formed to have a curved portion, instead of forming the grooves 26.

As described above, when the rotation portion 14 and the base portion 10 are parallel with each other by forming the grooves 36 or forming a curved portion at the leading end of a lower surface of the rotation portion, a distance between the rotation portion 14 and the base portion 10 can be reduced. This means the minimization of the thickness of the mobile device in carrying the mobile device.

Hereinafter, the hinge assembly having the configuration as described above and the mobile device having the same according to the present invention will be described in detail.

Figure 4B:
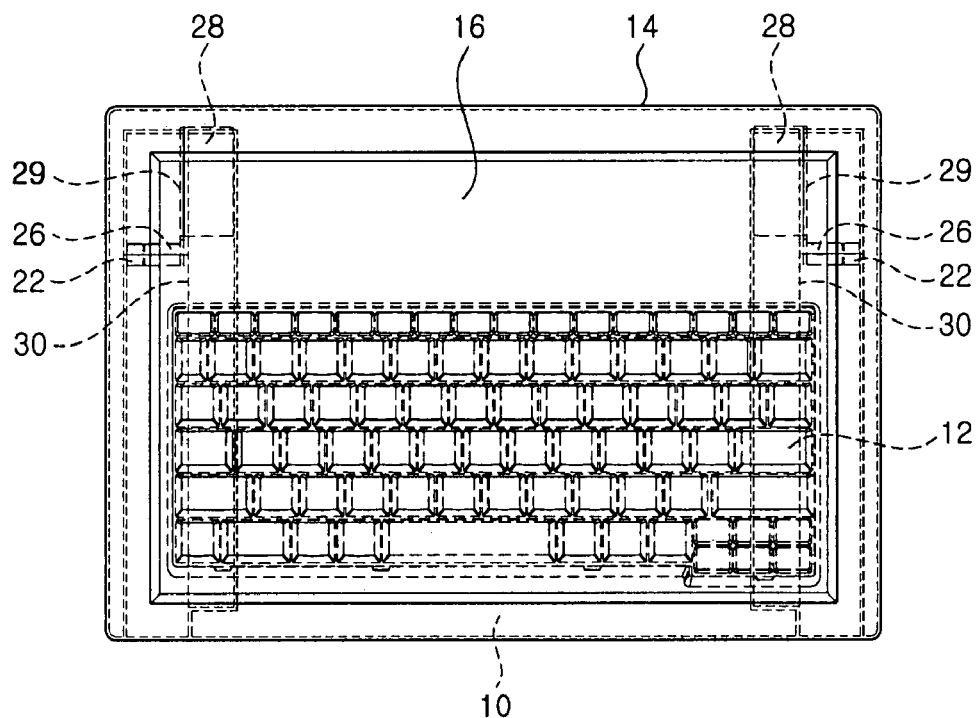

FIGS. 4A and 4B show the rotation portion 14 folded on the upper surface of the base portion 10, in which the display screen 16 of the rotation portion 14 is exposed upward. When the mobile device is used, a user can input information using a touch function of the display screen 16.

Figure 3A:
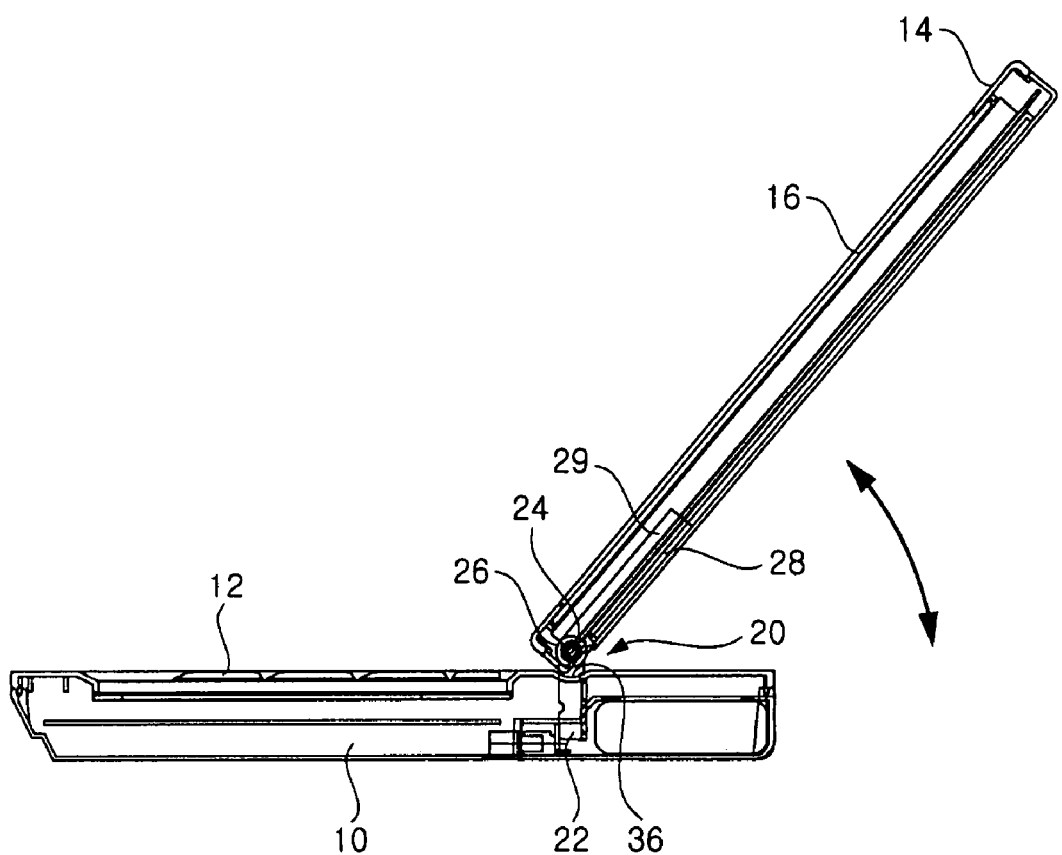
FIGS. 3A and 3B are a schematic side view and a plan view showing the configuration of the mobile device according to the embodiment of the present invention.
Figure 3B:
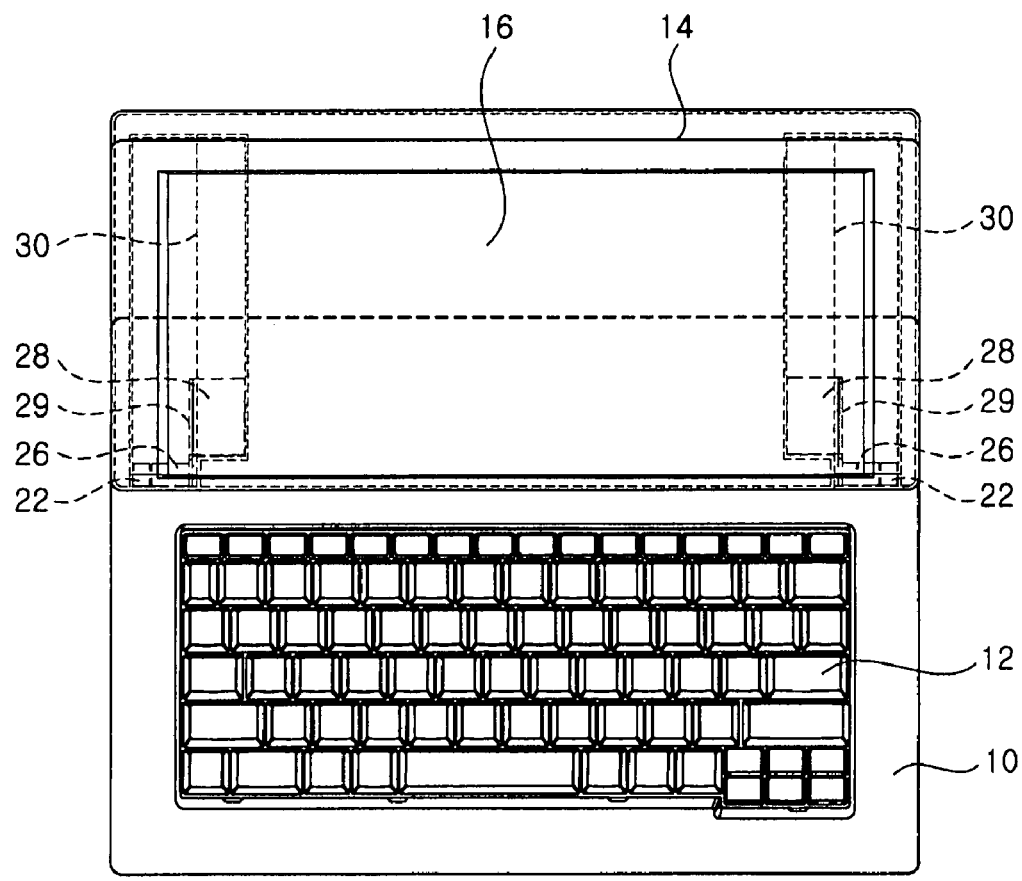

Next, a procedure of making the rotation portion 14 incline at a desired angle with respect to the base portion 10 as shown in FIGS. 3A and 3B will be described.

Figure 5A:
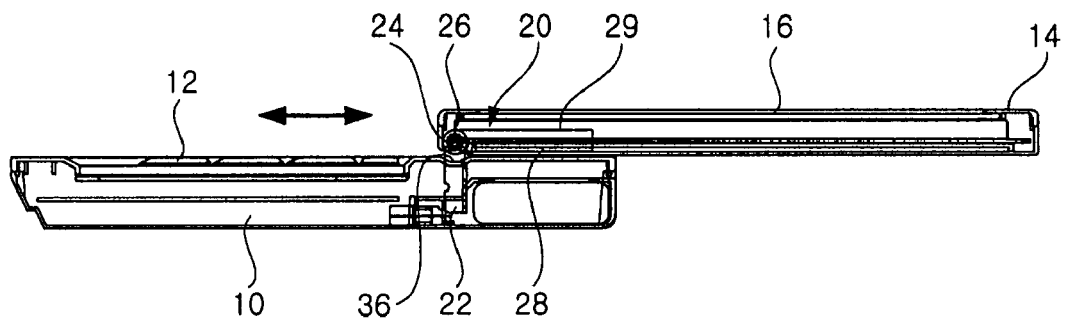
FIGS. 5A and 5B are views showing the operation of the mobile device according to the embodiment of the present invention, in which the rotation portion slides on the base portion.
Figure 5B:
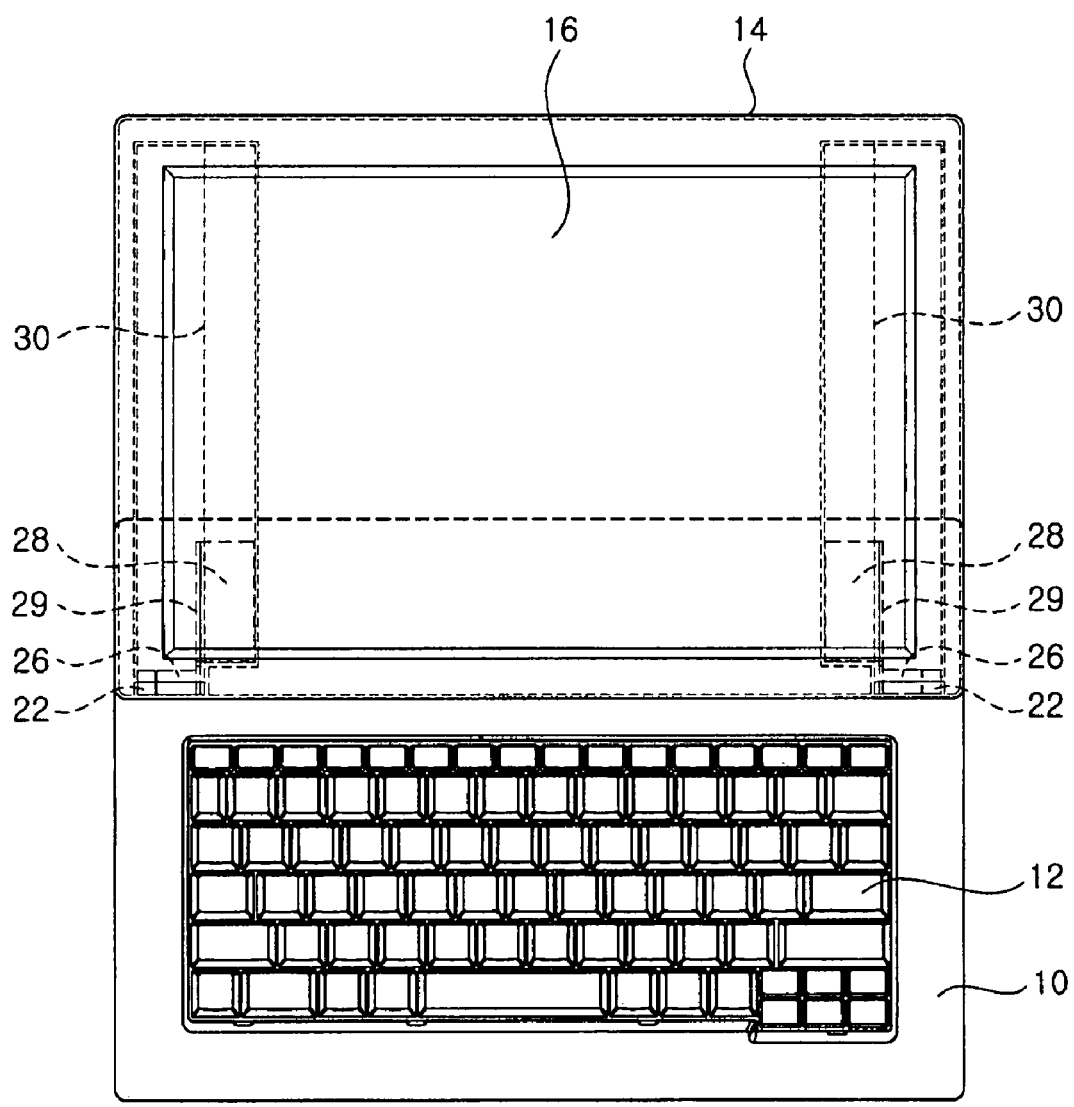

First, the rotation portion 14 is slid on the base portion 10. In other words, the rotation portion 14 is pushed toward the rear end of the base portion 10. On the contrary, force may be applied to the base portion 10 so that the base portion 10 moves toward the front portion of the rotation portion 14. Accordingly, the rotation portion 14 moves backward with respect to the base portion 10, as shown in FIGS. 5A and 5B.

Figure 5C:
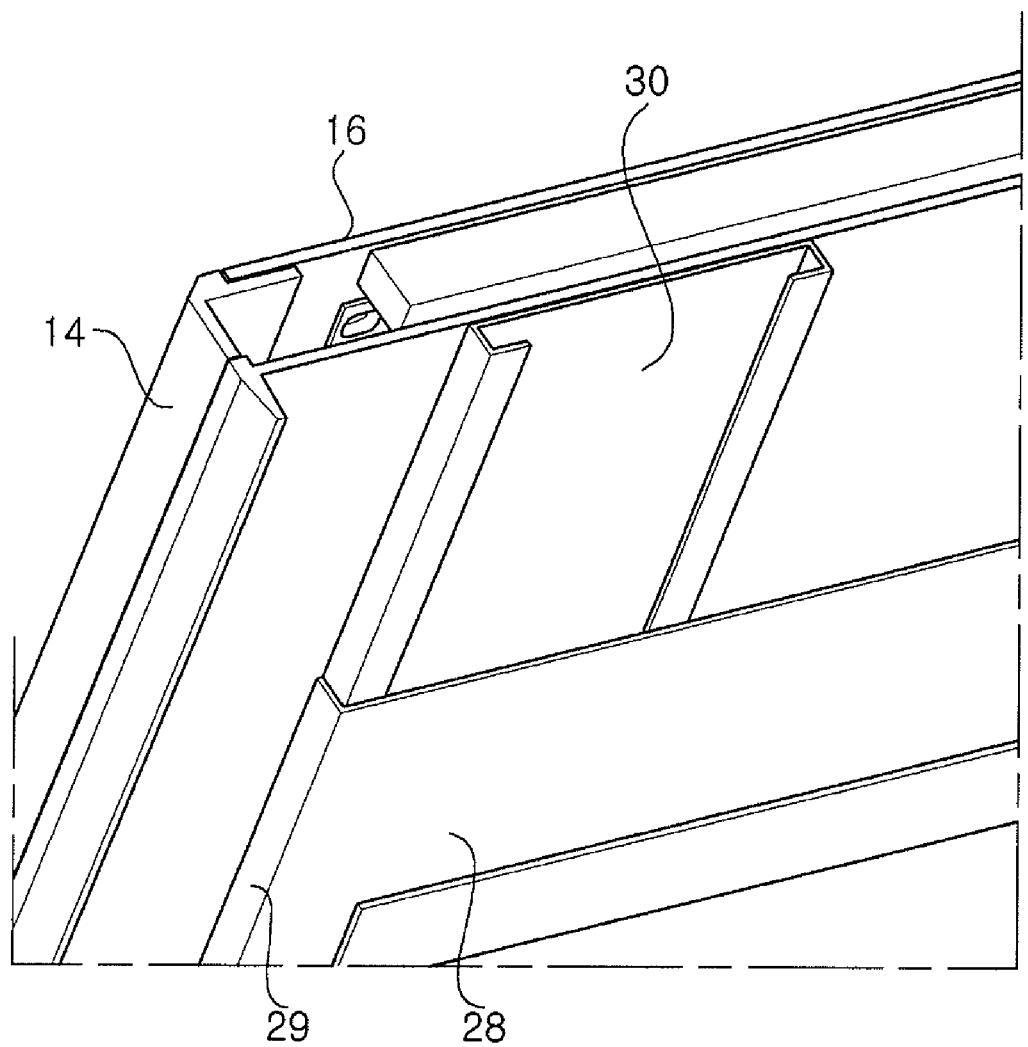
FIG. 5C is a detailed view of the hinge structure.

FIG. 5C depicts the guide rail mounted on the rotation portion 14 having the display screen 16. The figure depicts the relationship of the slide plate 28 and guide skirt 29 with the guide rail. The relationship between these different parts is clearly illustrated in the figure.

At this time, the base portion 10 and the hinge assembly 20 relatively move with respect to the rotation portion 14. Specifically, the hinge assembly 20 does not relatively move with respect to the base portion 10, and only the rotation portion 14 relatively moves with respect to the hinge assembly 20 and the base portion 10. Particularly, the guide rail 30 guides the movement of the slide plate 28 while the rotation portion 14 moves with respect to the base portion 10.

Next, the rotation portion 14 rotates forward and backward to be inclined with respect to the base portion 10 in view from the base portion 10. The rotation of the rotation portion 14 is shown in FIGS. 1, 3A and 3B. The rotation portion 14 rotates around the hinge shaft 24 with respect to the base portion 10. At this time, the rotation frame 26 and the slide plate 28 rotates along with the rotation portion 14 with respect to the base portion 10.

When the rotation portion 14 is inclined at a desired angle with respect to the base portion 10, information can be input by using the key board 12. Then, the input information is displayed on the display screen 16 of the rotation portion 14.

While the mobile device is used in the state shown in FIGS. 3A and 3B, the mobile device is operated in a reversed order so that the rotation portion 14 is folded on the upper surface of the base portion 10, and is used in the state shown in FIGS. 4A and 4B.

Next, another embodiment of the present invention will be described with reference to FIGS. 6 to 11. As shown in FIGS. 6 to 11, a base portion 110 has a flat hexagonal shape. A keyboard 112 is arranged on the upper surface of the base portion 110. The keyboard 112 has a plurality of keys arranged therein, which is used for a user to input information by pressing the keys with his/her fingers. A seating slit 113 is formed on the upper surface of a rear end of the base portion on which the keyboard 112 is mounted, for example, in a region spaced apart from a region on which the keyboard 112 is disposed. The seating slit 113 receives a vertical connection portion 127 of the rotation frame 126 of the hinge assembly 120. Various parts constituting the mobile device are installed in the base portion 110. For example, in the case of the tablet computer, a main-board, a hard-disk drive, etc. are installed in the tablet computer.

The rotation portion 114 is connected to the base portion 110 by means of the hinge assembly 120 described below. The rotation portion 114 can rotate or slide forward and backward by means of the hinge assembly 120 in view from the base portion 110. The display screen 116 is disposed on a surface of the rotation portion 114. A liquid crystal display panel is used as the display screen 116. The display screen 116 plays the role of displaying lots of information. Of course, in the case of the tablet computer, the display screen 116 is touched with a stylus pen so that it is possible to input information. Therefore, a liquid crystal display panel having a touch-screen function is preferably used as the display screen 116.

For reference, the configuration of the base portion 110 and the rotation portion 114 will be described. The base portion 110 includes at least a keyboard (in the case of mobile phone, a keypad). The rotation portion 114 is at least provided with a display screen 116. For example, a main-board, a hard-disk drive, etc. are mounted on the base portion 110 or the rotation portion 114, respectively.

Next, the configuration of the hinge assembly will be described. In the present embodiment, two hinge assemblies 120 are provided after the rear end of the keyboard 112 on both sides of the base portion 110, respectively. However, if the base portion 110 and the rotation portion 114 respectively have a small size, only a single hinge assembly may be provided on the base portion.

The stationary frame 122 is fixed to the inside of the base portion 110. The stationary frame 122 can be designed to have a shape or a size in proportion to the size or the weight of the rotation portion 114 which relatively moves with relation to the base portion 110.

The stationary frame 122 is provided with the rotation frame 126 rotating around the hinge shaft 124. The rotation frame 126 connects the rotation portion 114 to the base portion 110. The stationary frame 122 and the rotation frame 126 are arranged in series so that the hinge shaft 124 extends through the stationary frame 122 and the rotation frame 126.

In this embodiment, the hinge shaft 124 has one end thereof extending through the stationary frame 122 and the other end thereof extending through the rotation frame 126. However, it is not always the case. The stationary frame 122 and the rotation frames 126 through which the hinge shaft 124 extends are alternately arranged. For example, both ends of the hinge shaft 124 extend through the rotation frames 126, and the intermediate portion of the hinge shaft 124 extends through the stationary frame 122. Otherwise, both ends of the hinge shaft 124 extend through the stationary frames 122, and the intermediate portion of the hinge shaft 124 extends through the rotation frame 126.

Figure 2:
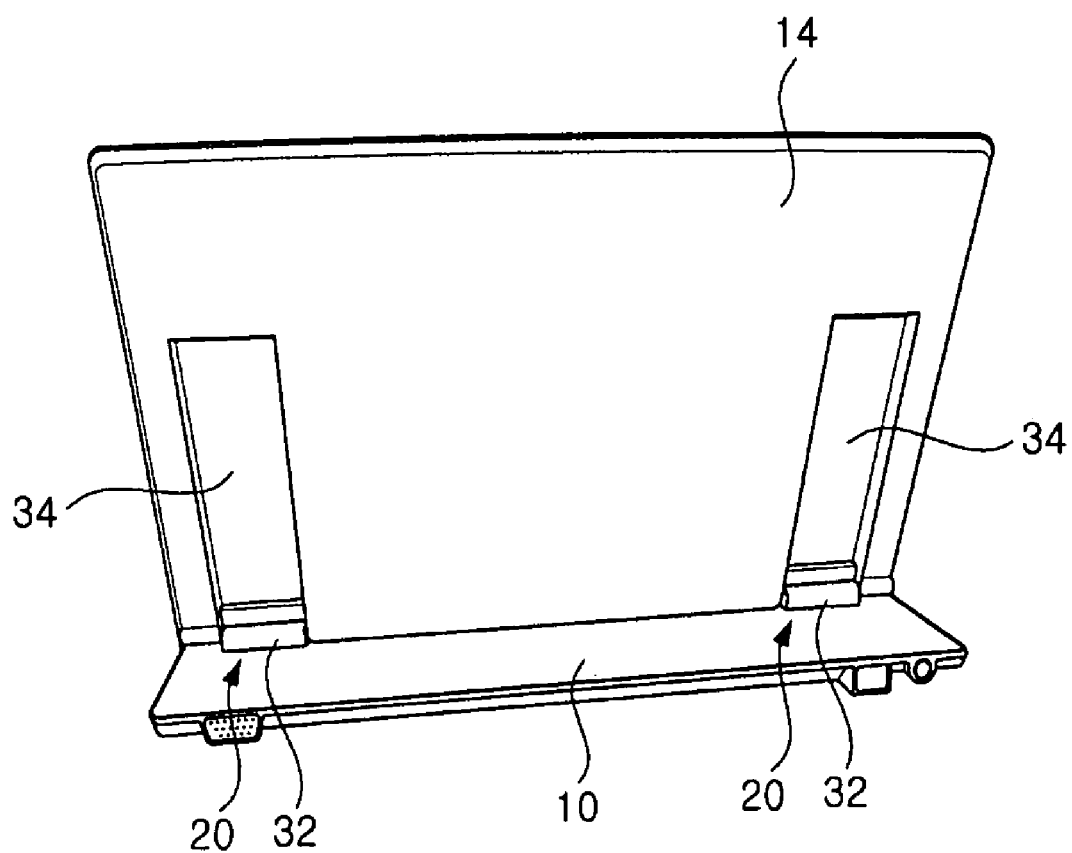
FIG. 2 is a perspective view showing the back portion of the mobile device employing the hinge assembly according to the embodiment of the present invention.

The vertical connection portion 127 and the slide plate 128 of the rotation frame 126 are mounted on the rotation portion 114. In this embodiment, the hinge assemblies 120 are connected to both ends of the slide plate 128. However, it is not absolutely the case where the hinge assemblies 120 are connected to both ends of the slide plate 128. The vertical connection portion 127 is formed to be perpendicular to the slide plate 128. In FIG. 2, the slide plate 128 and the vertical connection portion 127 are exposed to the outside. However, it is not always the case, and the slide plate 128 and the vertical connection portion 127 may be covered with a separate cover so as to be prevented from being exposed to the outside.

The slide plate 128 is provided with a rail guide portion 128' moving along the guide rail 130 described below. Step portions 129 are formed at both ends of the rail guide portion 128'. The step portions 129 are received in both ends of the guide rail 130, respectively, and maintains the coupling of the guide rail 130 and the rail guide portion 128'so that the guide rail 130 relatively moves with respect to the rail guide portion 128'. As described above, the rail guide portion 128' is provided on each hinge assembly 120.

The guide rail 130 is formed longitudinally on or in the rear surface of the rotation portion 114. The guide rail 130 guides the movement of the rail guide portion 128', so that the rotation portion 114 can slide on the base portion 110. The guide rail 130 is formed on the rear surface of the rotation portion 114 to extend longitudinally from the upper end to the lower end of the rotation portion 114. The guide rail 130 has both sides with a sectional shape of an alphabet C, which are opposite to each other and in which the step portions 129 are received, respectively.

The connection link mechanism 132 guides and protects a wire (not shown) for the electric connection between the base portion 110 and the rotation portion 114. The connection link mechanism 132 includes a rotation portion connection link 134 and a hinge connection link 140 which are connected to relatively rotate each other. The rotation portion connection link 134 and the hinge connection link 140 respectively have the other end rotatively connected to the rotation portion 114 and the slide plate 128, so as to guide a wire between the base portion 110 and the rotation portion 114.

The rotation portion connection link 134 has a rotation center portion 136 rotatively connected to a side of the rotation portion 114. The rotation center portion 136 is provided with a rotation shaft (not shown) which is rotatively inserted in the rotation portion. A withdrawal hole 114' is attached to a side of a guide rail which corresponds to a position at which the rotation center portion 136 is rotatively connected to the rotation portion 114. The wire extends through the withdrawal hole 114' into and out of the rotation portion 114.

The rotation connector 138 is provided on the other end of the rotation portion connection link 134. The rotation connector 138 is rotatively connected to the rotation connector 144 of the hinge connection link 140. The rotation portion connection link 134 has a bar shape with a desired width. Wire channels 139 are longitudinally formed on the rotation portion connection link 134. A plurality of wire channels 139 is formed on the rotation portion connection link 134. The width and depth of the rotation portion connection link 134 may be designed according to the kinds of wires.

Furthermore, the rotation portion connection link 134 is connected to the rotation portion 114 at an intermediate portion of the guide rail 130. This is to allow the rotation connection portion 138 to rotate around the rotation center portion 136 along a semi-circular trajectory. The rotation portion connection link 134 is formed to have a relatively shorter than the hinge connection link 140.

The hinge connection link 140 is rotatively connected to the slide plate 128. The hinge connection link 140 is provided with a rotation center portion 142 in order to rotatively connect the hinge connection link 140 to the slide plate 128. The rotation center portion also is provided with a rotation shaft, and thereby is rotatively connected to the slide plate 128. A position at which the rotation center portion 142 is connected to the slide plate 128 is adjacent to a guide rail 130 extending in parallel with a guide rail 130 neighboring on the rotation portion connection link 134.

Figure 6:
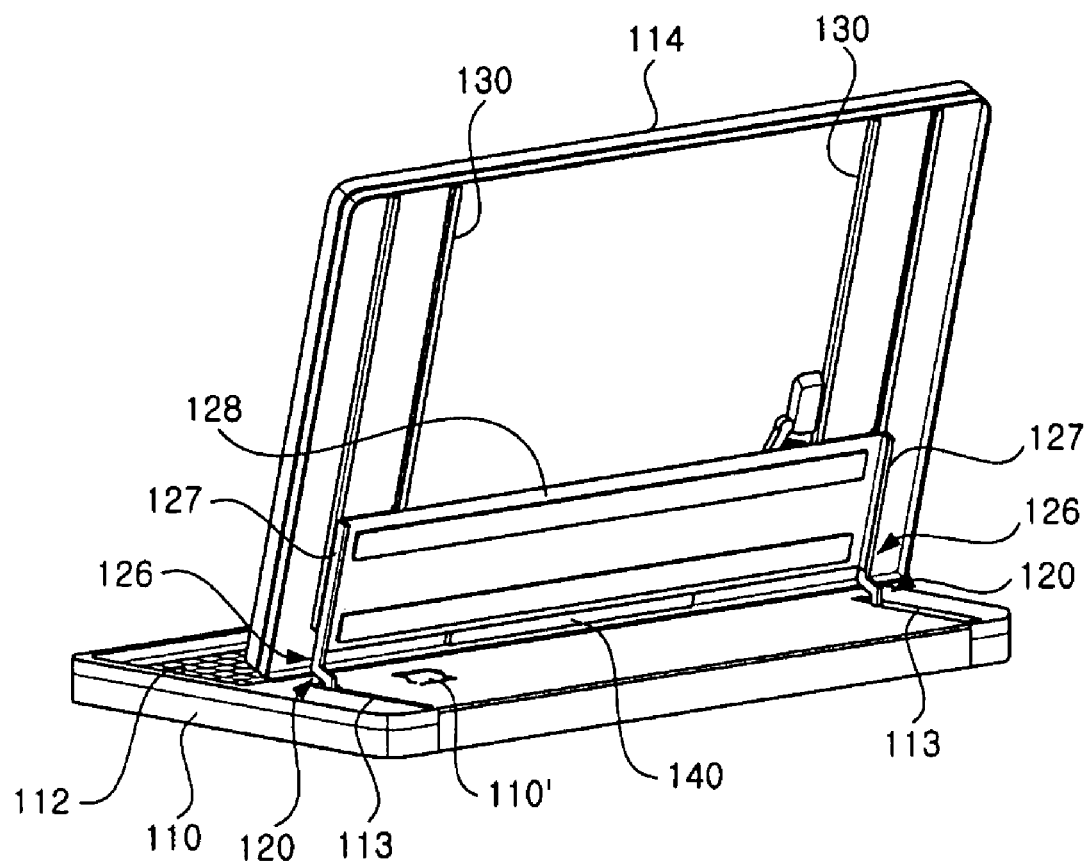
FIG. 6 is a schematic perspective view showing the configuration of a mobile device employing a hinge assembly according to another embodiment of the present invention.
Figure 7:
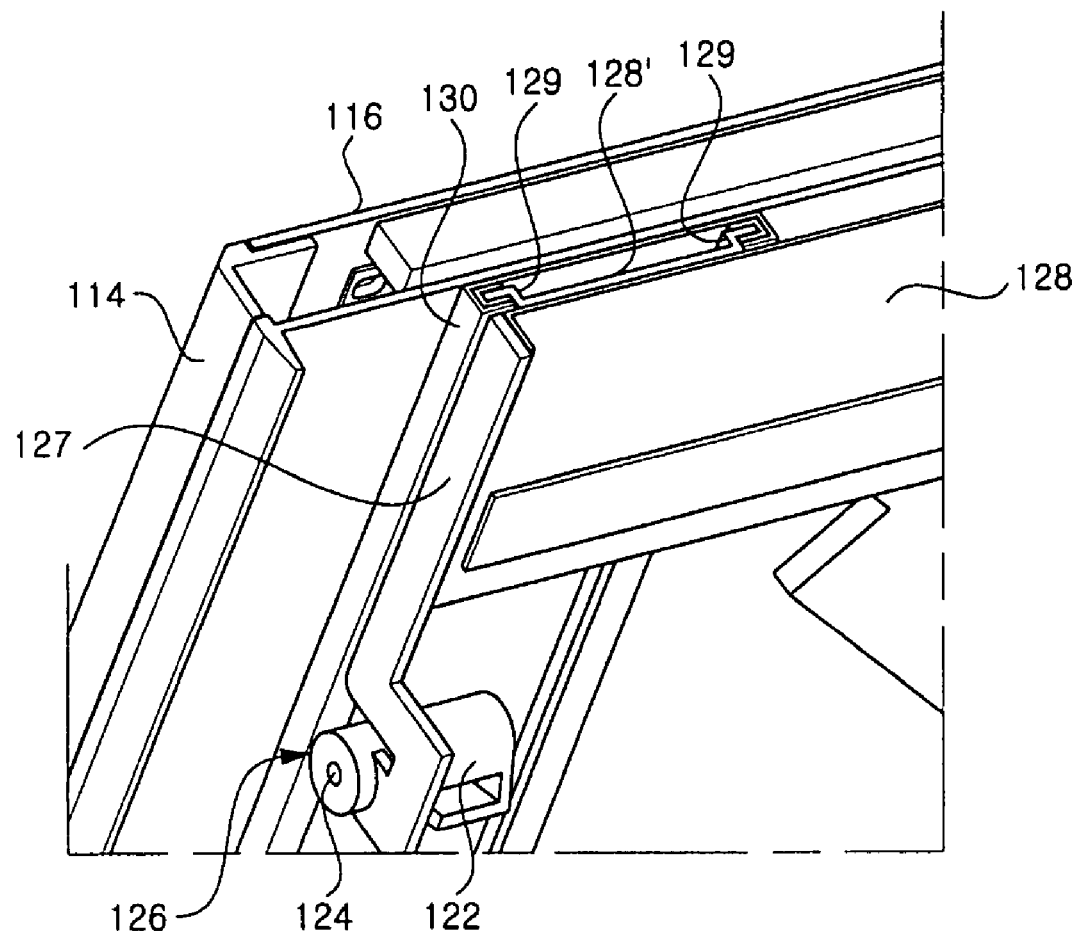
FIG. 7 is a partial perspective view showing the configuration of a main portion according to another embodiment of the present invention.
Figure 8:
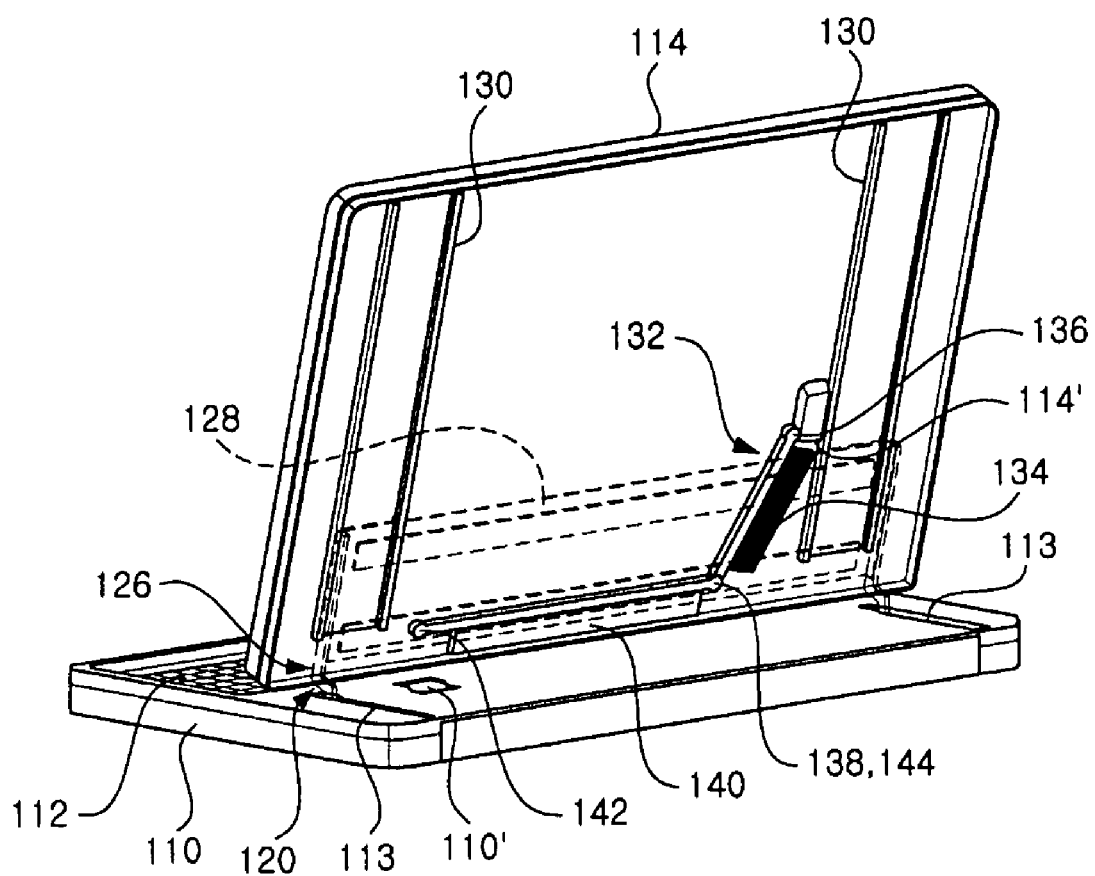
FIG. 8 is a schematic perspective view showing a connection link mechanism according to another embodiment of the present invention.
Figure 9:
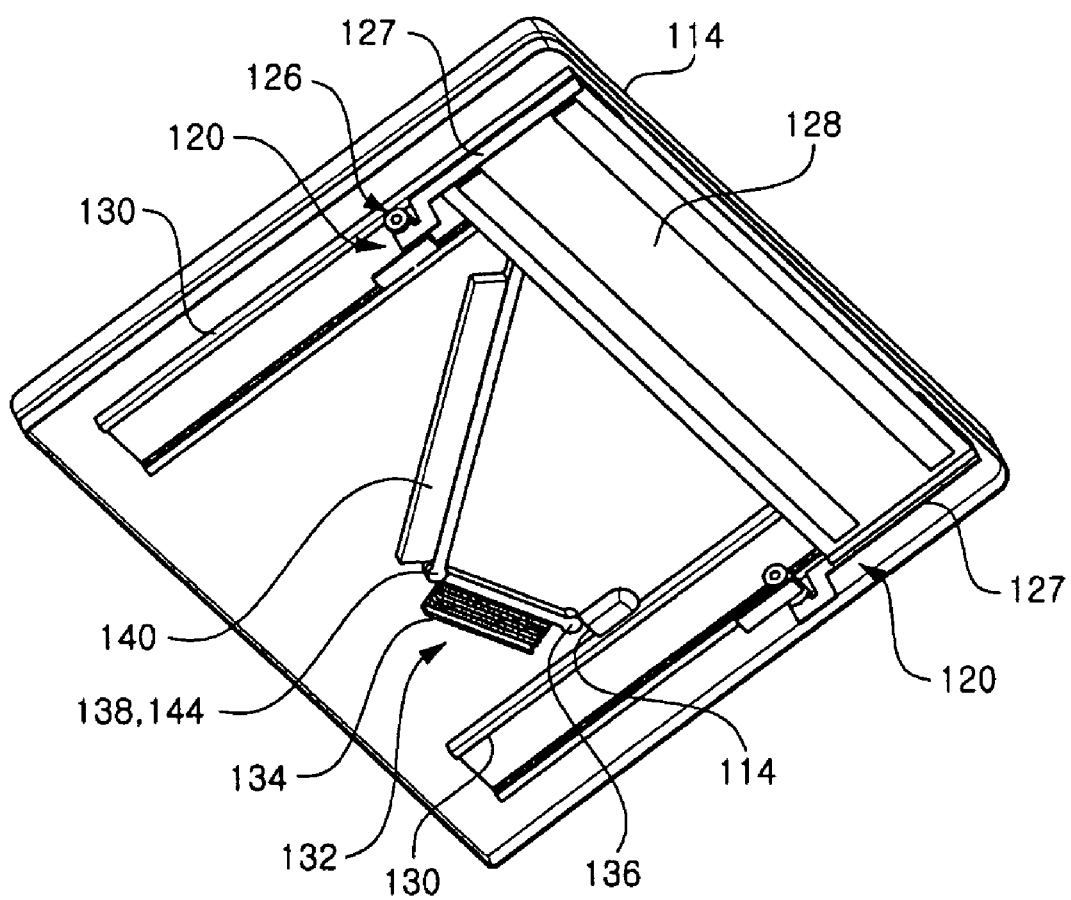
FIG. 9 is a perspective view showing a display unit according to another embodiment of the present invention, in which a base portion is removed.
Figure 10:
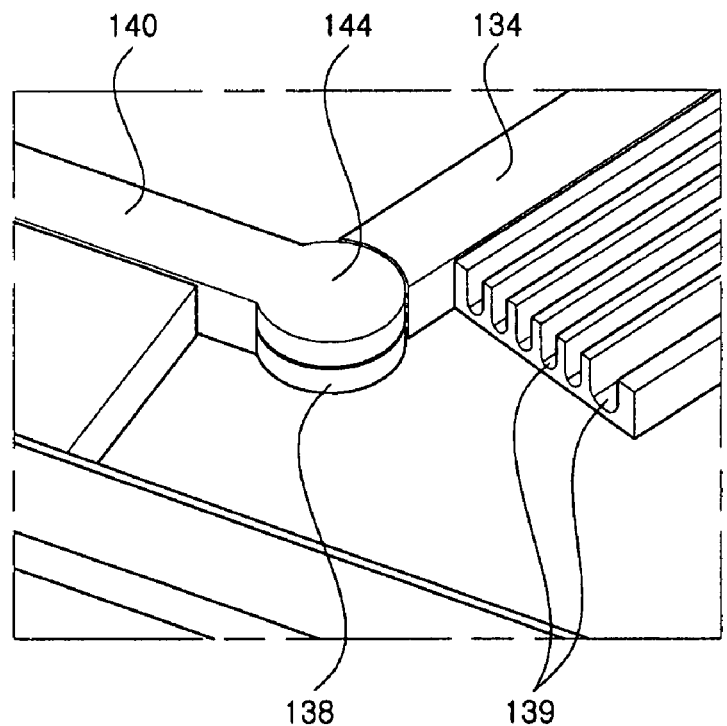
FIG. 10 is a partial perspective view showing the configuration of a connection link mechanism according to another embodiment of the present invention.
Figure 11:
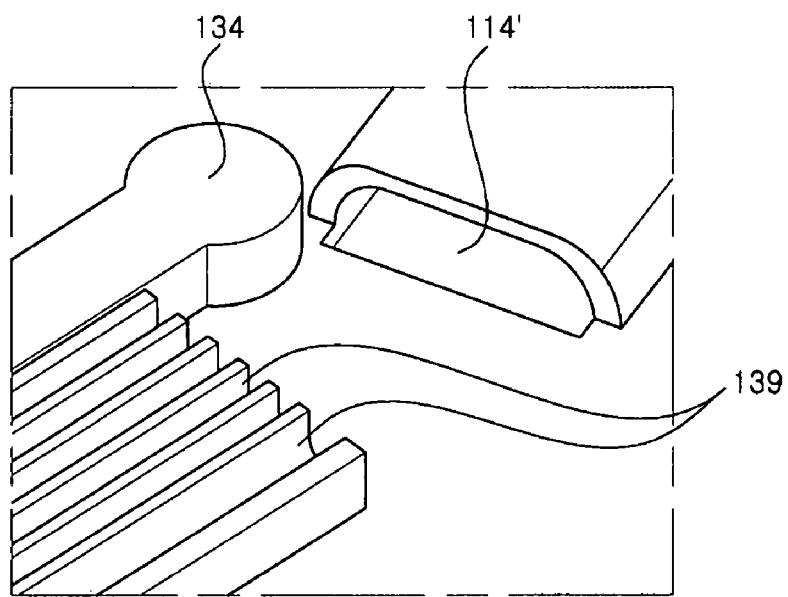
FIG. 11 is a partial perspective view showing the main portion of the connection link mechanism according to another embodiment of the present invention.

The hinge connection link 140 is provided with the rotation connector 144 at the other end thereof. The rotation connector 144 is rotatively connected to the rotation connector 138 of the rotation portion connection link 134. For example, the rotation connector 138 has a rotation shaft protruding thereon, which in turn is inserted into a rotation hole formed in the rotation connector 144. As shown in FIG. 6, a withdrawal hole 110' is formed in the base portion 110 corresponding to a portion at which the hinge connection link 140 is rotatively connected to the slide plate 128. A wire extends through the withdrawal hole 110' into and out of the base portion 110.

For reference, in the drawings of this embodiment, wire channels are not formed on the hinge connection link 140, but it is not always the case. In other words, wire channels may be formed on the hinge connection link 140.

Furthermore, the rotation portion 114 is supported to the base portion 110 by the rotation frame 126 and the slide plate 128. Of course, the rotation frame 126 and the slide frame 128 can move with respect to the rotation portion 114. Therefore, it is preferably designed that either the rotation frame 126 or the slide plate 128 moves in the rotation portion 114 when force greater than a predetermined level is applied to the rotation portion 114.

Hereinafter, the operation of the hinge assembly and the mobile device having the same, which have configuration described above, according to the present invention will be described in detail.

Figure 12A:
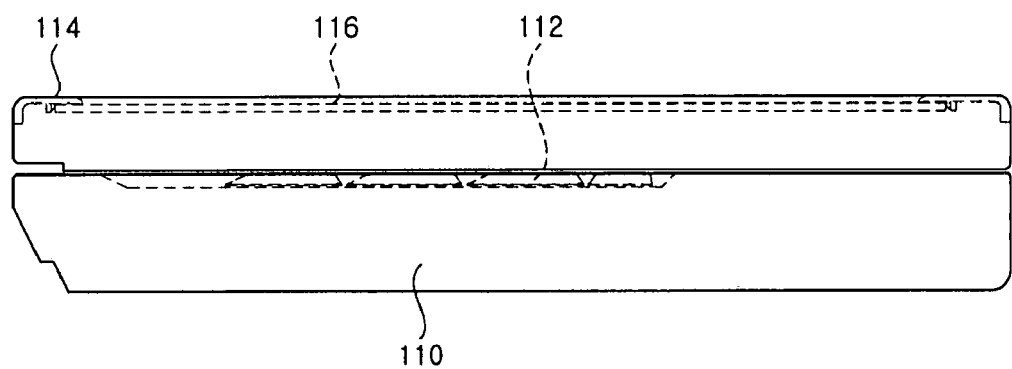
FIGS. 12A to 12C are views showing the operation of the rotation portion which slides and rotates with respect to the base portion according to another embodiment of the present invention.
Figure 12B:
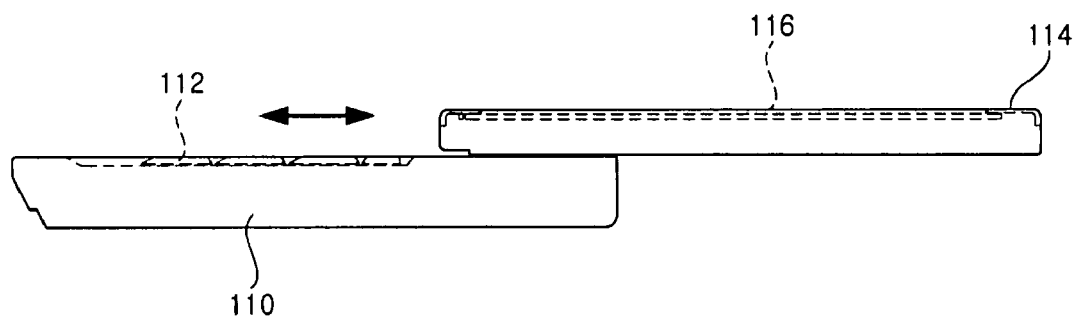
Figure 12C:
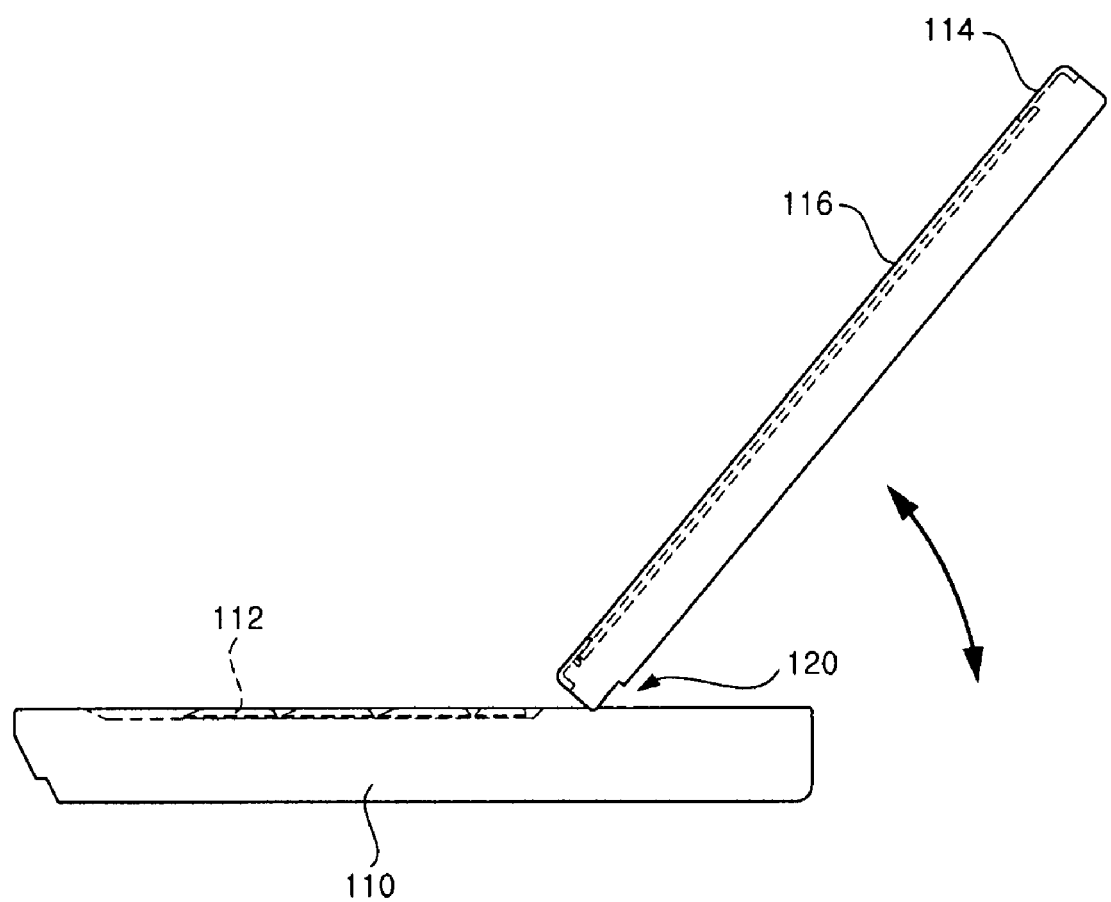

FIGS. 12A to 12C illustrate the operation of the mobile device of this embodiment of the present invention. FIG. 12A shows the rotation portion 114 overlapping the base portion 110. In this state, a user can input information using a touch-function in a display screen 116.

FIG. 12B shows the rotation portion 114 sliding on the base portion 110. In this state, the keyboard 112 is not covered with the rotation portion 114 any more. The rail guide portion 128' is relatively located at a lower portion of the guide rail 130.

In this state shown in FIG. 12B, the rotation portion 114 rotates to a desired angle with respect to the base portion 110. As shown in FIG. 12C, the rotation portion 114 can be inclined at a predetermined angle. This can be established by relatively rotating the stationary frame 124 and the rotation frame 126 of the hinge assembly 120.

In a procedure of moving the rotation portion 114 on the base portion 110 from a location shown in FIG. 12A to a location shown in FIG. 12B, the operation of the connection link mechanism 132 will be described with reference to FIGS. 13A to 13D.

Figure 13A:
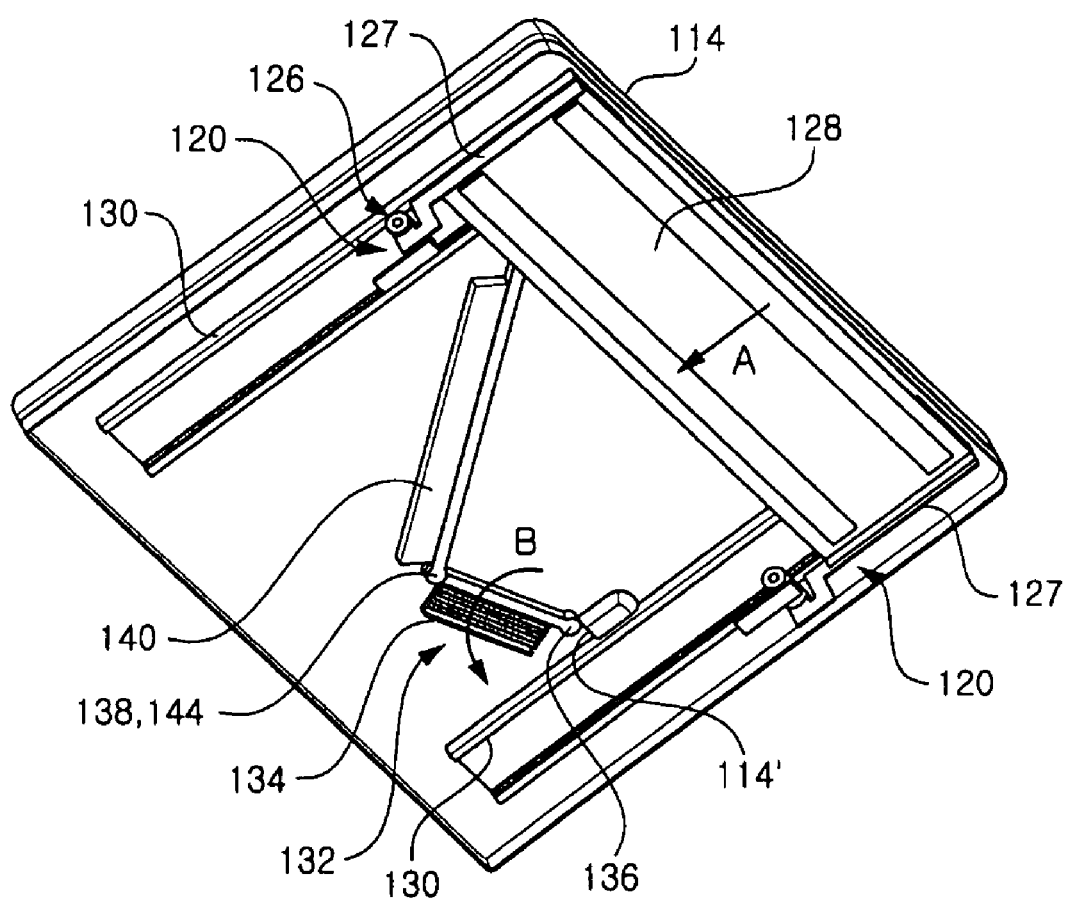
FIGS. 13A to 13D are views showing the operation of the connection link mechanism according to another embodiment of the present invention.
Figure 13B:
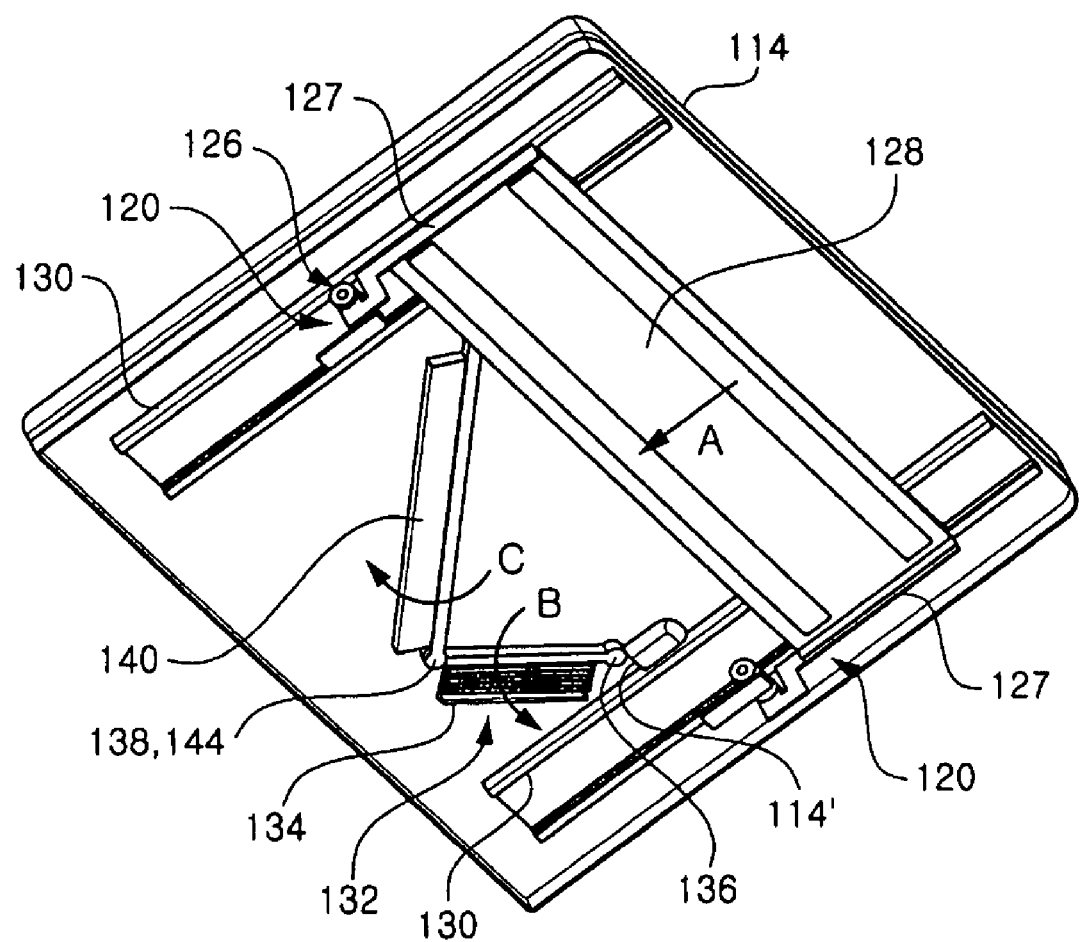

First, the status of the connection link mechanism 132 corresponding to the status of the rotation portion 114 shown in FIG. 12A is shown in FIG. 13A. The slide plate 128 is located at an edge of the rotation portion 114. In this state, when the rotation portion 114 and the slide plate 128 moves relatively, for example, the slide plate 128 moves in a direction marked by an arrow A, the hinge connection link 140 pushes and enables the rotation portion connection link 134 to rotate in a direction marked by an arrow B. At this time, the hinge connection link 140 rotates a little but hardly, so as to push the rotation portion connection link 134. The operation of the hinge connection link 140 continues in FIG. 13B.

Figure 13C:
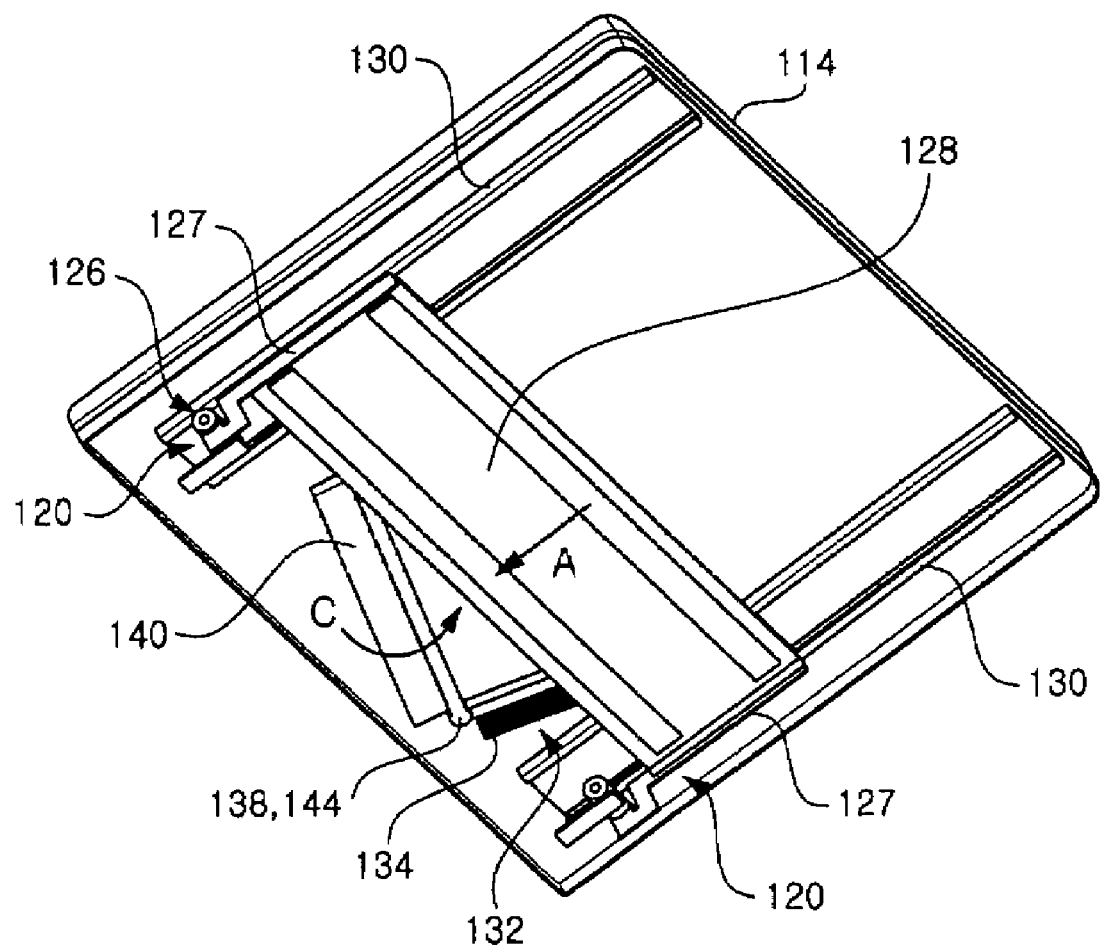

As shown in FIG. 13C, when the slide plate 128 reaches a predetermined location, furthermore, the hinge connection link 140 starts to rotate in a direction marked by an arrow C. This rotation starts at a time when the rotation portion connection link 134 is in parallel to the guide rail 130.

Figure 13D:
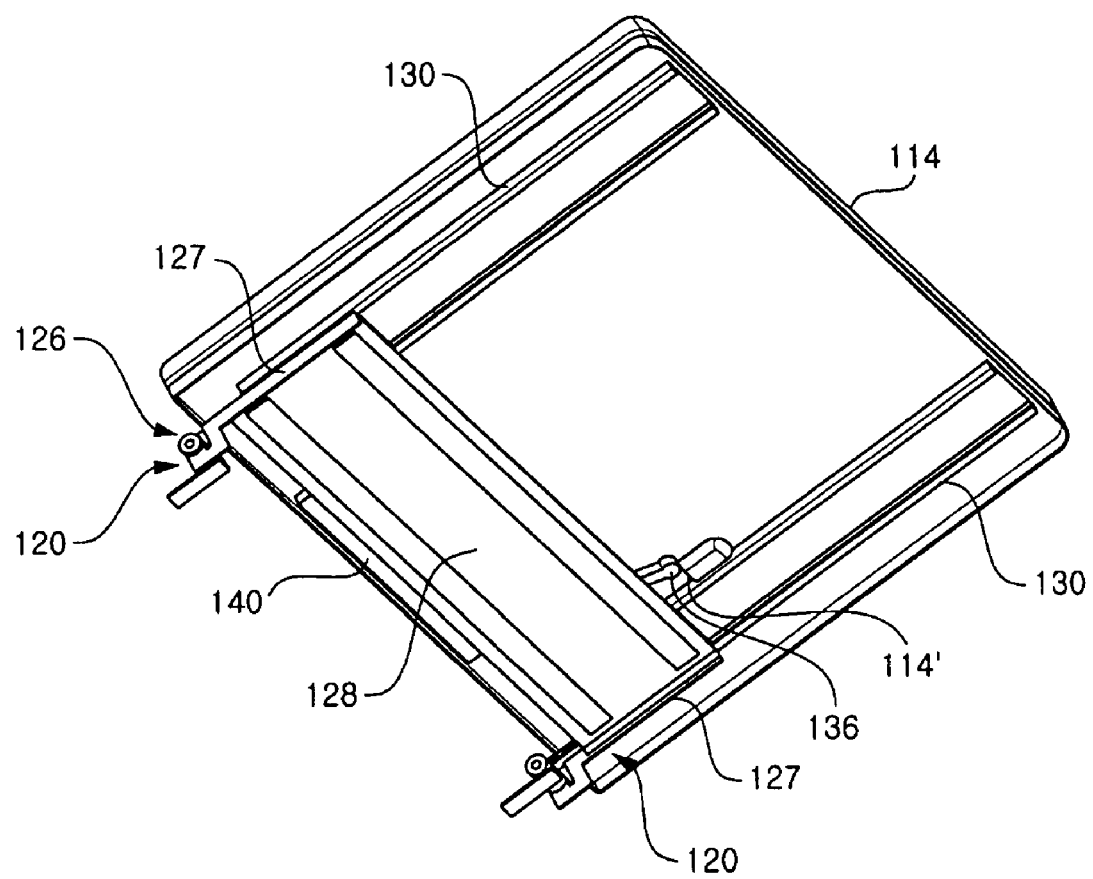

Finally, when the slide plate 128 reaches the other end of the rotation portion 114, the connection link mechanism 132 is in this state shown in FIG. 13D. This state is the same as the state shown in FIG. 8. In this state, the rotation portion 114 can rotate around the hinge axis 124 with respect to the base portion 110.

When the rotation portion 114 rotates and moves to overlap the base portion 110, the connection link mechanism 132 operates in a reverse order from FIG. 13D to FIG. 13A. As operating in the above-mentioned way, the connection link mechanism 132 can guide and protect a wire carrying out an electric connection between the base portion 110 and the rotation portion 114.

The hinge assembly and the mobile device having the same according to the present invention as described above have advantages as follows:

In the present invention, first, when the rotation portion slides by a predetermined distance and then rotates, or rotates and slides in a reverse direction, the mode of the display screen on the rotation portion can be converted. In other words, the user pushes and slides the rotation portion from a leading end to a rear portion of the base portion, and then pulls the upper end of the base in a reverse direction to rotate the rotation portion. Accordingly, in the present invention, the relative movement of the rotation portion with respect to the base portion can be easily carried out, thereby easily converting the mode of the display screen.

Further, even though the installed state of the display screen of the rotation portion is changed, frontward, backward, leftward and rightward directions of the display screen is not changed and still maintained. Therefore, a configuration to change a displaying direction of the display screen according to the change of the frontward, backward, leftward and rightward directions of the display screen may be not provided after the mode of the display screen is changed. As a result, it is expected that the configuration of the mobile device can be relatively simplified.

In addition, in the present invention, since the connection link mechanism guides and protects the wire electrically connecting the rotation portion to the base portion, the stable connection between the base portion and the rotation portion can be achieved and prevented from being damaged.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

What is claimed is:

1. A mobile device comprising:
   a base portion, the base portion including a keyboard;
   a slidable rotation portion mounted on the base portion, the rotation portion provided with a display screen and configured to cover the keyboard on the base portion; and
   a hinge assembly configured to connect the rotation portion to the base portion, the hinge assembly comprising:
      a stationary frame located in the base portion so as not to move relative to the base portion,
      a slide plate located to slide on the rotation portion, and
      a rotation frame integrated with the slide plate to relatively rotate around a hinge shaft with respect to the stationary frame, and
   a guide rail located on the rotation portion on a side opposite of the display screen, the guide rail configured to guide the relative movement of the slide plate,
   wherein after the rotation portion is slid along the guide rail toward a rear end of the base portion, the rotation portion is rotatable with respect to the base portion.

2. The mobile device as claimed in claim 1, wherein portions of the stationary frame and the rotation frame constituting the hinge assembly, through which the hinge shaft extends, protrude on the upper surface of the base portion, and slide channels are formed on the rear surface of the rotation portion in order to prevent the interference of the rotation portion with the protruding portions.

3. The mobile device as claimed in claim 2, wherein a portion of the hinge assembly protruding on the upper surface of the base portion is covered with a hinge cover.

4. The mobile device as claimed in claim 1, further comprising a plurality of hinge assemblies, the slide plate connected to the plurality of hinge assemblies.

5. The mobile device as claimed in claim 1, wherein the rotation portion further comprises guide rails for guiding the relative movement of the slide plate of the hinge assembly, wherein a guide skirt is provided on one end of the slide plate sliding and guided by the guide rails.

6. The mobile device as claimed in claim 1, wherein a groove is formed in the base portion so that the hinge assembly extends to each end of the portions protruding on the upper surface of the base, so as to prevent the-interference when the rotation portion rotates.

7. The mobile device as claimed in claim 1, wherein portions of the stationary frame and the rotation frame, through which the hinge shaft extends, are alternately arranged.

8. A mobile device comprising:
   a base portion provided with a keyboard;
   a rotation portion movably mounted on the base portion and provided with display screen;
   a hinge assembly configured to connect the rotation portion to the base portion, which includes a stationary frame fixed to the base portion, a rotation frame relatively rotating around a hinge shaft with respect to the stationary frame, and a slide plate integrated with the rotation frame and having rail guides for allowing the rotation portion to slide on the base portion; and
   a connection link mechanism including a rotation portion connection link rotatively connected to the rotation portion and a hinge connection link rotatively connected to the rotation portion connection link and the slide plate,
   wherein, after the rotation portion is slid toward a rear end of the base portion, the rotation portion is rotatable with respect to the base portion about a hinge shaft.

9. The mobile device as claimed in claim 8, wherein wire channels are formed in the rotation portion connection link and the hinge connection link which constitute the connection link mechanism, so as to receive wires.

10. The mobile device as claimed in claim 9, wherein the rotation portion connection link is rotatively connected to the rotation portion at a location adjacent to an intermediate portion of one of the guide rails, and is relatively shorter than the hinge connection link.

11. The mobile device as claimed in claim 10, wherein the rotation portion is provided with the guide rails for guiding the relative movement of the slide plate of the hinge assembly, and the rail guide portions of the slide plate are provided at both sides thereof with step portions, respectively, and guided by means of the guide rails.

12. The mobile device as claimed in claim 9, wherein a portion of the rotation frame of the hinge assembly is rotatively connected to the stationary frame on the base portion, and a vertical connector of the rotation frame, which is connected to the slide plate perpendicularly, is located on the rotation portion.

13. The mobile device as claimed in claim 12, wherein the base portion has a seating slit formed at a side on the upper surface of the base portion, in which the vertical connector is received.

14. A mobile device comprising:
   a base portion, the base portion including a keyboard;
   a slidable rotation portion connected to the base portion, the rotation portion provided with a display screen and configured to cover the keyboard on the base portion;
   a hinge assembly configured to connect the base portion to the rotation portion, the hinge assembly comprising:
      a stationary frame mounted on the base portion;
      a rotation frame mounted on the rotation portion and relatively rotating around a hinge shaft; and
      a slide plate connected to the rotation frame, the slide plate engaging the rotation portion to allow the rotation portion to slide relative to the base portion independent of rotation movement relative to the base portion; and
   a guide rail located on the rotation portion on a side opposite the display screen and configured to guide the relative movement of the slide plate.

15. The mobile device as claimed in claim 1, wherein the display screen is a touch screen.

16. The mobile device as claimed in claim 8, wherein the display screen is a touch screen.

17. The mobile device as claimed in claim 14, wherein the display screen is a touch screen.

* * * * *